Figure 1:
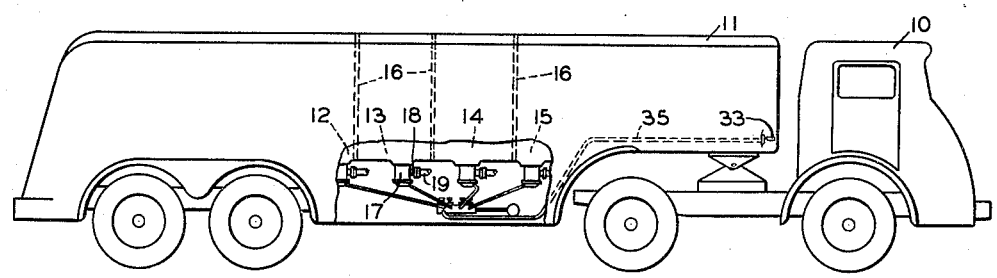

May 16, 1950 J. H. DE FREES 2,508,231
FUSIBLE AND FRANGIBLE PLUG FOR SAFETY SYSTEMS
Filed Dec. 31, 1948

*INVENTOR.*
JOSEPH H. DeFREES
BY
Hyde, Meyer, Baldwin & Doran
ATTORNEYS

Patented May 16, 1950

2,508,231

UNITED STATES PATENT OFFICE 2,508,231

FUSIBLE AND FRANGIBLE PLUG FOR SAFETY SYSTEMS

Joseph H. De Frees, Warren, Pa.

Application December 31, 1948, Serial No. 68,678

3 Claims. (Cl. 137—139)

The invention relates to a device for either manually or automatically equalizing pressure between a closed system and the atmosphere. While it is adaptable to various uses, it will be described in connection with a safety system for closures for the storage or transportation of explosive or inflammable liquids such as gasoline, or the like.

As is well known to those skilled in the art such liquids are often carried or stored in multi-chambered tanks each chamber usually having an individual discharge outlet and a valve control therefor. If the outlet connections are damaged by accident or otherwise, discharge of the contents may result in a disastrous fire with possible personal injury to the attendant, truck driver, or others in the vicinity. In any event such damage to the discharge means may result in substantial property and oil loss.

Various emergency valve structures have heretofore been devised to prevent discharge of the liquid except when the operator is in active control of the discharge. In one of the preferred embodiments of such structures, in addition to the manually controllable valve provided at the usual discharge outlet for each compartment, there is provided in liquid flow sequence therewith, an additional valve commonly termed an emergency valve, at a relatively inaccessible position in the tank bottom wall so as to be invulnerable to normal injury or shock. The emergency valve thus provided is normally closed so that fluid conduit and connections external thereto may suffer damage without liquid discharge from the tank.

In my copending applications, Serial Numbers 54,335 and 54,336 there is disclosed control and operating means for emergency valves of the type just mentioned. Briefly, the emergency valve is normally biased to closed position, and is opened only when the operator is in active control of the operation. Opening is achieved by admitting compressed air to a diaphragm servomotor effective upon the valve, so that the valve remains open only as long as the air pressure is maintained. This system will be explained hereinbelow to such extent only as is necessary for a complete understanding of the present invention.

An object of the invention is to provide improved means for readily and rapidly equalizing pressure between a closed system, and the atmosphere.

A further object of this invention is to provide novel and improved means for rapidly venting to atmosphere the head of compressed air effective in maintaining the emergency valve of a transportation tank in open position, whereby the valve may be permitted to rapidly close under situations giving rise to danger of fire or explosion.

Another object of the invention is to provide means such as defined in the last preceding paragraph whereby the compressed air head may be vented by application of a moderate blow of the hand, foot, etc., in combination with means whereby such venting is accomplished automatically when the temperature rises to a condition of danger.

Figure 2:
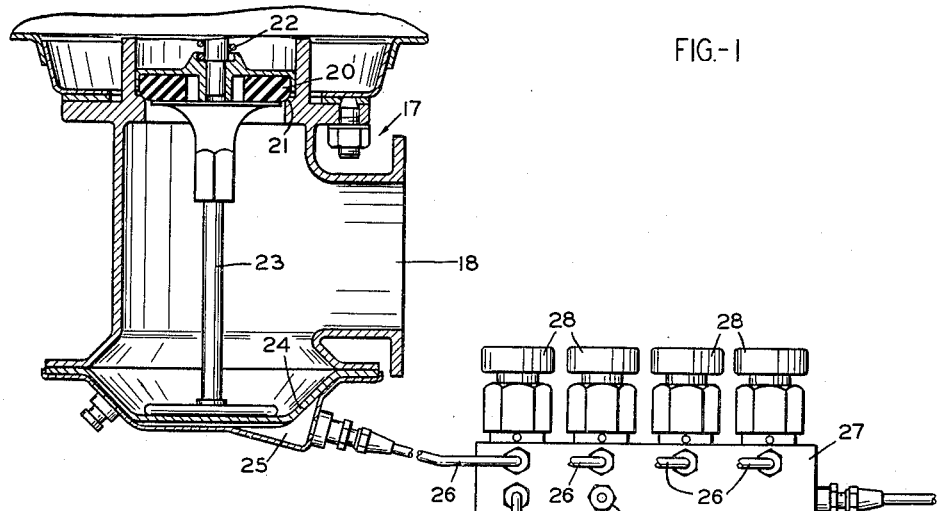
Figure 3:
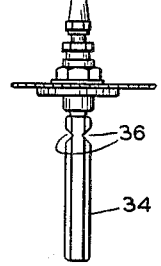

Other objects and advantages will be apparent from a study of the following description, in conjunction with the accompanying drawings, in which:

Fig. 1 is a schematic showing, in side elevation with parts broken away, of a liquid transportation vehicle equipped with emergency valves and a valve operating system embodying my invention; Fig. 2 is a fragmentary view, greatly enlarged and partly in section, partly in side elevation, showing a portion of the apparatus illustrated in Fig. 1; and, Fig. 3 is a view, still further enlarged, showing a part of the structure illustrated in Figs. 1 and 2.

Figs. 1 and 2 schematically show the operating relationship of the various cooperating elements of an emergency valve system equipped with my invention. The drawings show in conventional outline a power tractor or truck 10, and a trailer 11, the trailer having a plurality of compartments 12, 13, 14, 15 separated by transverse partitions 16. From the lowest portion of each compartment depends an emergency valve 17 such as is illustrated in enlarged form in Fig. 2. All such valves are identical, and each is provided with a liquid discharge port 18 in communication with liquid discharge piping 19. The valve head 20 is normally maintained in sealing contact with its seat 21 by spring means 22 more fully illustrated and described in my aforesaid copending applications. The valve is raised to open position by means of a push rod 23 supported on an impermeable diaphragm 24, the diaphragm being movable upwardly when compressed air is admitted to diaphragm chamber 25.

From each emergency valve an individual pipe 26 extends to a fluid power distributing manifold 27 which, as will be understood, may incorporate in or adjacent thereto an airpump, or may have a connection to the air pressure source for air brakes, if there is one. The source of air pressure is immaterial, it being sufficient to here say that manifold 27 is provided with the aforesaid pipes 26, each individually supplying power to its respective diaphragm chamber 25, and each individually controlled to on or off position by a manually operatable valve 28.

It will be readily understood that the manifold is located in a control cabinet located at any convenient point on the vehicle body, and is schematically indicated as being on the side of the trailer. When the operator desired to discharge any liquid from one or other of the compartments he opens a manually operatable valve (not shown) in the discharge conduit 19, and then opens one of the individual control valves 28, thereby admitting fluid pressure to a diaphragm chamber 25, so as to open the emergency valve as desired.

None of the emergency valves can be opened if the air in the manifold is vented to atmosphere. They can of course be opened by an operator entering the tank interior through a manhole in the top, but this is normally done only in case of relatively permanent failure of the control system just described, or for major repairs. The liquid discharge can be effectively stopped, however, by venting the manifold as noted.

In cases of emergency, such as when a fire breaks out in the vicinity of the vehicle, or perhaps even in the cabinet containing the manifold 27 and other controls, I have provided novel and improved remote control means consisting of one or more devices 33 in operative communication with the manifold or diaphragm chamber. As here shown such device consists of a hollow plug 34 in fluid flow communication with the manifold through a pipe 35. The plug wall is deeply notched at 36 on opposed outer surfaces and it can be broken by a moderately sharp blow of the hand, so as to vent the air system, whereupon spring 22 immediately closes the emergency valve. The plug 34 is also provided with a low melting point sealing member 37 so that if the operator is unable to reach plug 34 by reason of the heat, or is afraid to make the attempt, the sealing member will rapidly melt out and vent the air system, thereby providing in the same instrumentality a double safety feature.

In the schematic illustration, Fig. 1, the fusible and frangible device is shown as being situated at the front end of the trailer, adjacent the operator's cab. Obviously, other such devices may be similarly used, being distributed around the trailer in other locations. An additional plug 34a is shown in Fig. 2 as being actually tapped into the manifold 27, so as to be immediately available to an operator who happens to be at the controls.

The device just described has distinct advantages over pressure release mechanisms of the stop-cock type, which are usually operated by rotation of a knob or wing nut. In the present invention relief of pressure is instantaneous, no tools are required for its operation, and leakage is impossible because there are no movable parts.

It will be obvious that any closed system wherein a pressure differential exists with respect to the atmosphere, may be effectively and rapidly vented, either manually or in the presence of abnormal temperatures, by means of the device just described.

What I claim is:

1. In a safety system for use with containers for explosive or inflammable liquids, in combination, a liquid discharge control valve, means for normally biasing said valve to closed position, pressure fluid supply means for opening said valve to discharge said liquid, and means for venting said pressure fluid to atmosphere including a plug having a hollow bore in fluid flow communication with said pressure fluid, said plug having a weakened wall portion whereby such wall portion is readily frangible to vent said bore and exhaust said fluid, said plug also having a wall portion susceptible to melting at temperatures somewhat above normal, whereby to likewise vent said bore and exhaust said fluid when the temperature exceeds a predetermined figure.

2. In a container for explosive or inflammable liquids wherein said container is provided with a discharge valve normally biased to close position but adapted to be opened by the application of fluid under pressure thereto, and with a pressure chamber for receiving said fluid, means for rapidly venting said chamber to atmosphere comprising a protruding plug having a hollow bore in fluid flow communication with said chamber, said plug having a wall portion reduced in thickness whereby to be readily frangible to vent said bore and consequently said chamber, said plug likewise having a wall portion adapted to melt at abnormally high temperature, whereby likewise to vent said bore and said chamber when the temperature approaches a dangerous point.

3. In a safety system for use with a container for explosive or inflammable liquids, in combination, a liquid discharge valve for controlling liquid flow from said container, means normally biasing said valve to closed position, means including a chamber having a movable wall portion effective upon said valve to open the same when fluid under pressure is admitted to said chamber, and means for venting said chamber to atmosphere including a plug having a hollow bore in fluid flow communication with said chamber, said plug having a weakened wall portion whereby such wall portion is readily frangible to vent said bore and exhaust said fluid from said chamber, said plug having another wall portion susceptible to melting at temperatures somewhat above normal, whereby to likewise vent said bore and exhaust said fluid when the temperature exceeds a predetermined figure.

JOSEPH H. DE FREES.

REFERENCES CITED

The following references are of record in the file of this patent:

UNITED STATES PATENTS

| Number | Name | Date |
|---|---|---|
| 786,779 | Sykes | Apr. 4, 1905 |
| 938,859 | Hewitt | Nov. 2, 1909 |
| 1,206,485 | Tague | Nov. 28, 1916 |
| 1,707,566 | Perkins | Apr. 2, 1929 |
| 1,898,482 | Doughty | Feb. 21, 1933 |
| 2,224,844 | MacFarren | Dec. 17, 1940 |